(12) United States Patent
Pautz (10) Patent No.: US 10,830,287 B2
(45) Date of Patent: Nov. 10, 2020

(54) DRIVE TRAIN FOR DRIVING A WORKING UNIT OF A SELF-PROPELLED HARVESTER

(71) Applicant: CLAAS Selbstfahrende Erntemaschinen GmbH, Harsewinkel (DE)

(72) Inventor: Peter Pautz, Oerlinghausen (DE)

(73) Assignee: CLAAS Selbstfahrende Erntemaschinen GmbH, Harswewinkel (DE)

( * ) Notice: Subject to any disclaimer, the term of this patent is extended or adjusted under 35 U.S.C. 154(b) by 270 days.

(21) Appl. No.: 16/006,191

(22) Filed: Jun. 12, 2018

(65) Prior Publication Data

US 2019/0055993 A1 Feb. 21, 2019

(30) Foreign Application Priority Data

Aug. 18, 2017 (DE) .......................... 10 2017 118 858

(51) Int. Cl.
| | |
|---|---|
| *F16D 13/76* | (2006.01) |
| *F16H 7/12* | (2006.01) |
| *F16D 13/40* | (2006.01) |
| *F16D 7/02* | (2006.01) |
| *A01D 69/08* | (2006.01) |
| *A01D 41/12* | (2006.01) |

(Continued)

(52) U.S. Cl.
CPC ......... *F16D 13/76* (2013.01); *A01D 41/1243* (2013.01); *A01D 69/08* (2013.01); *A01D 75/182* (2013.01); *F16D 7/025* (2013.01); *F16D 13/40* (2013.01); *F16H 7/1281* (2013.01); *F16H 2007/0806* (2013.01); *F16H 2007/0865* (2013.01); *F16H 2007/0893* (2013.01)

(58) Field of Classification Search
CPC ............. F16D 25/0635; F16D 25/0638; A01D 41/1243; A01D 41/142; B60K 23/0808
USPC ...................................................... 474/69, 70
See application file for complete search history.

(56) References Cited

U.S. PATENT DOCUMENTS

| | | | | |
|---|---|---|---|---|
| 2,073,146 | A | * | 3/1937 | Gardiner ............... F16D 13/583 192/70.14 |
| 3,217,851 | A | * | 11/1965 | Mogk ..................... F16D 25/06 192/85.24 |

(Continued)

FOREIGN PATENT DOCUMENTS

| | | |
|---|---|---|
| DE | 102009014101 A1 | 9/2010 |
| EP | 0207685 A1 | 1/1987 |
| EP | 2839729 B1 | 5/2016 |

OTHER PUBLICATIONS

European Search Report for EP Application No. 18168429.1-1006, dated Oct. 15, 2018.

*Primary Examiner* — Henry Y Liu
(74) *Attorney, Agent, or Firm* — Lempia Summerfield Katz LLC (57) ABSTRACT

A drive train for driving a working unit of a self-propelled harvester is disclosed. The drive train includes a selectable belt drive with a drive belt, which operationally combines a drive belt pulley and an output belt pulley. The output belt pulley of the belt drive is operationally connected to the working unit via a drive shaft. The drive train comprises a clutch system, combining the functions of a belt clutch and an overload clutch into a single construction unit, with the response characteristic of the overload clutch system being hydraulically adjustable.

18 Claims, 5 Drawing Sheets

(51) Int. Cl.
*A01D 75/18* (2006.01)
*F16H 7/08* (2006.01)

(56) References Cited

U.S. PATENT DOCUMENTS

| | | | | |
|---|---|---|---|---|
| 3,765,514 A * | 10/1973 | Harrison | B60T 1/062 | 188/72.4 |
| 3,789,943 A * | 2/1974 | Kampert | B62D 53/026 | 180/54.1 |
| 4,520,912 A * | 6/1985 | Ferris | F16D 25/0635 | 192/106 F |
| 4,690,662 A * | 9/1987 | Nagano | B62M 25/04 | 474/69 |
| 4,706,789 A * | 11/1987 | McColl | F16D 25/14 | 477/180 |
| 4,740,191 A * | 4/1988 | Takano | F16H 37/021 | 474/11 |
| 4,856,635 A * | 8/1989 | Vlamakis | F16D 25/0635 | 192/70.12 |
| 4,964,506 A * | 10/1990 | Benford | F16D 25/0638 | 192/106 F |
| 4,997,074 A * | 3/1991 | Larson | F16D 25/0635 | 192/70.28 |
| 5,527,218 A * | 6/1996 | Van den Bossche | A01D 41/142 | 460/116 |
| 5,778,644 A * | 7/1998 | Keller | A01D 41/142 | 56/11.2 |
| 5,956,998 A * | 9/1999 | Fenelon | E05B 81/25 | 292/144 |
| 6,708,808 B1 * | 3/2004 | Andres | F16D 25/0638 | 188/71.5 |
| 6,893,368 B2 * | 5/2005 | Fujiwara | F16H 55/36 | 474/70 |
| 9,313,949 B2 * | 4/2016 | Knierbein | A01D 41/1243 | |
| 2004/0216979 A1 * | 11/2004 | Yamashita | F16H 45/02 | 192/212 |
| 2005/0230172 A1 * | 10/2005 | Hopper | B60K 23/0808 | 180/247 |
| 2006/0032722 A1 * | 2/2006 | Guinter | F16D 25/0638 | 192/85.33 |
| 2006/0191359 A1 * | 8/2006 | Tarasinski | A01F 15/0841 | 74/11 |
| 2006/0223640 A1 * | 10/2006 | Bassett | F16D 25/0638 | 464/30 |
| 2008/0277182 A1 * | 11/2008 | Heindl | B60K 23/0808 | 180/242 |
| 2009/0264253 A1 * | 10/2009 | Herchick | F16D 48/06 | 477/175 |
| 2010/0288597 A1 * | 11/2010 | Kuwahara | F16H 57/0421 | 192/85.61 |
| 2013/0247527 A1 * | 9/2013 | Brockmann | A01D 43/08 | 56/11.3 |
| 2015/0050969 A1 * | 2/2015 | Knierbein | A01D 41/1243 | 460/112 |
| 2020/0072297 A1 * | 3/2020 | Reubens | F16D 9/06 | |

* cited by examiner

DRIVE TRAIN FOR DRIVING A WORKING UNIT OF A SELF-PROPELLED HARVESTER

CROSS REFERENCE TO RELATED APPLICATION

This application claims priority under 35 U.S.C. § 119 to German Patent Application No. DE 102017118858.4, filed Aug. 18, 2017, the entire disclosure of which is hereby incorporated herein by reference.

TECHNICAL FIELD

The technical field relates to an agricultural machine. More specifically, the technical field relates to a drive train for driving a working unit of a self-propelled or self-driven harvester.

BACKGROUND

EP 2 839 729 B1 (corresponding U.S. Pat. No. 9,313,949, incorporated by reference herein in its entirety) discloses a drive train that includes a belt drive is used for driving a radial spreader of a harvester. The radial spreader comprises two rotors that may be propelled or driven in a rotating manner. To accomplish this, a drive belt, which operationally combines a drive pulley and an output belt pulley, is engaged using a hydraulically operated coupling cylinder. Additional supports are used as guides for the belt in order to enable coupling in and out of the drive belt. The output belt pulley of the belt drive is operationally connected to the radial spreader via a drive shaft. In particular, the drive train of the spreading mechanism may comprise a belt drive that is engaged by a clutch and which drives a first transmission stage via an output shaft, at least one second transmission stage that is drivably connected to the first transmission stage by a shaft, and a braking device. Each transmission stage may comprise at least one output shaft for driving the rotor.

The drive shaft leads into a first transmission stage of a first rotor. A further shaft emanates from the first transmission stage, which leads into a second transmission stage of the second rotor. In order to secure the radial spreader against overload, such as due to the blocking of a rotor, a friction clutch is provided on one transmission input shaft of one input transmission.

DESCRIPTION OF THE FIGURES

The present application is further described in the detailed description which follows, in reference to the noted plurality of drawings by way of non-limiting examples of exemplary implementation, in which like reference numerals represent similar parts throughout the several views of the drawings, and wherein.

DETAILED DESCRIPTION

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

Typically, a drive train may need several components for coupling via the hydraulically operated coupling cylinder. For example, additional supports for guiding of the belt may be needed during the coupling operation, which may necessitate a larger assigned space to house various components of the drive train. In addition, the additional supports may need to be adjusted. Further, wear on the belt may increase since the belt is not permanently tensioned. The drive train, being at least partially open to the elements, may be exposed to dirt, damage and adverse weather conditions. Due to the limited construction space, the friction clutch at the input transmission may only absorb a limited amount of energy due to its construction size before damage occurs therein.

In one implementation, a drive train is disclosed for a working unit, wherein the drive train comprises a structure that is simpler and that may require a smaller housing and less assigned space.

For example, the drive train may be configured to drive a working unit of a self-propelled harvester, with the drive train comprising: a selectable belt drive comprising a drive belt, a drive belt pulley, and an output belt pulley, wherein the output belt pulley of the belt drive is operationally connected to the working unit via a drive shaft; and a clutch system configured to operate a belt clutch and an overload clutch, wherein the clutch system is housed in a structural unit, and wherein a response characteristic of the overload clutch is hydraulically adjustable.

In another implementation, the drive train may be incorporated in a self-propelled (or self-drive) harvester that includes a working unit (such as a radial spreader), a pressure source, and a control unit, with the drive train being configured to drive or propel the working unit (such as drive the radial spreader).

In order to configure the drive train in a manner that is simpler and more construction space efficient, the drive train may comprise a clutch system, which may be configured to combine the functions of a belt clutch and an overload clutch into one structural unit, and that the response characteristic of the clutch system is hydraulically adjustable. The combining of the functions of coupling and overload protection into one structural unit may generate one or more results including: (1) reducing the size of the clutch system; and/or (2) reducing the complexity of the clutch system. Thus, in one implementation, one or more elements may be eliminated from the clutch system including any one, any combination, or all of: the coupling cylinder, the friction clutch, the supports for the guiding of the belt. In accordance with one implementation of the disclosed clutch system, the belt tension may be permanently maintained, which may extend the life span of the belt. The hydraulic adjustability of the response characteristic of the clutch system may be used for overload protection in that a hydraulic pressure at the clutch system, which may be referred to herein as clutch pressure, may be limited to a maximum amount, so that the overload clutch slips when the set maximum clutch pressure is surpassed by an equivalent torque. This slipping threshold may be adjusted using one or more maximum pressure levels, thereby reducing the complexity of the clutch system.

In one implementation, the clutch system, with the overload functionality, may comprise a hydraulically operated single-disc dry clutch (which may be reset via a spring), comprising a housing section that can be designed as output belt pulley. The components that perform the switching as well as the overload protection may be arranged or positioned within a single housing, so that the effects of dirt or weather conditions may be reduced. Further, the design of the single-disc dry clutch, which allows for a high energy absorption, allows for reduction in the slipping time or the wear of the clutch. Integrating the output belt pulley into a housing that houses the single-disc dry clutch may simplify the structure, with the housing configured to protect the single-disc dry clutch from dirt and adverse weather conditions.

The single-disc dry clutch may include a section that can be pressurized. Pressure may be applied to or may be reduced to the section using the adjustable clutch pressure. For example, pressure may be applied or reduced depending on the function of the clutch system that is performing, such as in the instance of coupling in or out for the torque transmission. Using the controlled pressure applied to this section via the clutch pressure, the torque transmission is performed in a friction-locked manner.

In one implementation, the control the hydraulic pressure, which is applied to the pressurized section via a pressure source, may be dependent on at least one aspect of the harvester, such as at least one operating parameter of the working using. This hydraulic pressure, which may be referred to as clutch pressure, may be adjusted in one of several ways, such as via a control valve arrangement. Thus, in practice, a relief valve, which may comprise a directly controlled or balanced relief valve under the control of the control unit, may be used in order to adapt the clutch pressure to the at least one operating parameter. Various operating parameters are contemplated. For example, the operating parameters may comprise the drive torque and/or the drive speed of the working unit. In one implementation, various pressure sources may be used. For example, work hydraulics (which may already be included in the harvester) or a separate hydraulic pump may be used as a pressure source. In particular, when using a separate hydraulic pump, the separate hydraulic pump may likewise be used as at least one further working unit for the drive. Thus, an adjustable pressure relief value may be used for controlling or regulating the clutch pressure.

In one implementation, a spring-loaded belt tensioning unit may be included for pre-tensioning of the drive belt. Using the belt tensioning unit is in contrast to a typical drive train, which is switched using the hydraulically actuated coupling cylinder and is simultaneously used for pre-tensioning of the drive belt. The belt tensioning unit may be simpler in its structure and more cost efficient.

In one implementation, a mechanical brake may be integrated into the drive train. The mechanical brake may be used in order to prevent the driven working unit from continuing to run for a long time after it has been switched off. In this regard, preventing the working unit from continuing to run may improve operational safety of the working unit.

Various types of working units are contemplated. In one implementation, the working unit comprises a radial spreader. The radial spreader may be used to distribute chopped straw over the working width of the attachment device that is arranged at or connected to the harvester. The radial spreader may furthermore be designed to be transferred into a so-called swath deposit position in order to deposit the straw that has been gathered by the harvester in the form of swaths. The clutch system may be suitable for one or both operating situations of such a radial spreader. For example, the clutch system may be configured for operation with regard to the torque transmission, and also one or both of the overload protection function in the spreading operation (e.g., when a blockage occurs in one of the rotors), and/or in that it interrupts the drive train during the swath deposit operation.

In one implementation, the radial spreader comprises at least two rotors (e.g., two rotors, four rotors, etc.). For example, the radial spreader of a self-propelled harvester may generally comprise at least two propelled rotors, which are used to distribute chopped straw over the working width of an attachment device that is arranged at or attached to the harvester. For working widths of 12 meters and more, the radial spreader may also be configured with a total of four rotors. The necessary clutch pressure may be adapted in accordance with the various versions of the radial spreader without having to re-dimension the single-disc dry clutch. For example, the clutch pressure applied may be dependent on the number of rotors of the radial spreader, as discussed further below.

The above-mentioned task may be performed using a self-propelled harvester with a working unit that comprises a radial spreader, a pressure source, and a control unit, wherein the self-propelled harvester comprises one drive train for driving the radial spreader.

In one implementation, the control unit may be configured to adjust the response characteristic of the overload clutch in order to control the hydraulic pressure at the pressurized section. In this way, the overload function may be adapted based on one or more parameters. For example, the overload function may be adapted, using the clutch pressure, based on any one, any combination, or all of: one or more aspects of the radial spreader (e.g., the design of the radial spreader, such as whether the radial spreader has two or four rotors); the drive speed of the rotors; and the wear of the clutch system.

Alternatively, or in addition, the control unit may be configured to control the applied hydraulic pressure dependent on one or more harvested crop characteristics. Further, the operating behavior of the rotors of the radial spreader may be determined based on one or more characteristics of the harvested crop that is to be distributed, such as any one, any combination, or all of: the flow rate, the moisture, the length of the material that is to be chopped, the type of crop. The control unit may consider any one, any combination, or all of these harvested crop characteristics when adapting, such as continuously adapting, the hydraulically adjusted overload torque.

The control unit may furthermore be configured to regulate the applied hydraulic pressure dependent on at least one operating parameter of the radial spreader. For example, when regulating the clutch pressure, the control unit may consider a torque peak in the drive train that arises during the startup procedure of the radial spreader. The control unit may perform this in one of several ways. In one way, the control unit may access a memory that stores at least one corresponding start-up routine or of a respective pressure course in the control unit, which may result in a temporary activation of a high clutch pressure (e.g., a maximum allowable clutch pressure). The control unit may select this start-up routine when the radial spreader is started or before the coupling by means of the clutch system, respectively.

The clutch pressure may be subsequently reduced to a lower level in accordance with at least one overload routine that can be stored in the control unit, which corresponds to the desired overload torque and which may be dependent, among other things, on the harvested crop characteristics. Thus, the control unit may consider different configurations or variations of the radial spreader in their regulation of the clutch system in various aspects of operation, such as during the start-up and overload routines (e.g., raise or lower the maximum allowable clutch pressure based on the different configurations or various of the radial spreader).

In one implementation, the use of one drive train with the disclosed clutch system may be used for other working equipment units of the self-propelled harvester, which includes an attachment device that is accommodated and driven by the harvester.

Figure 1:
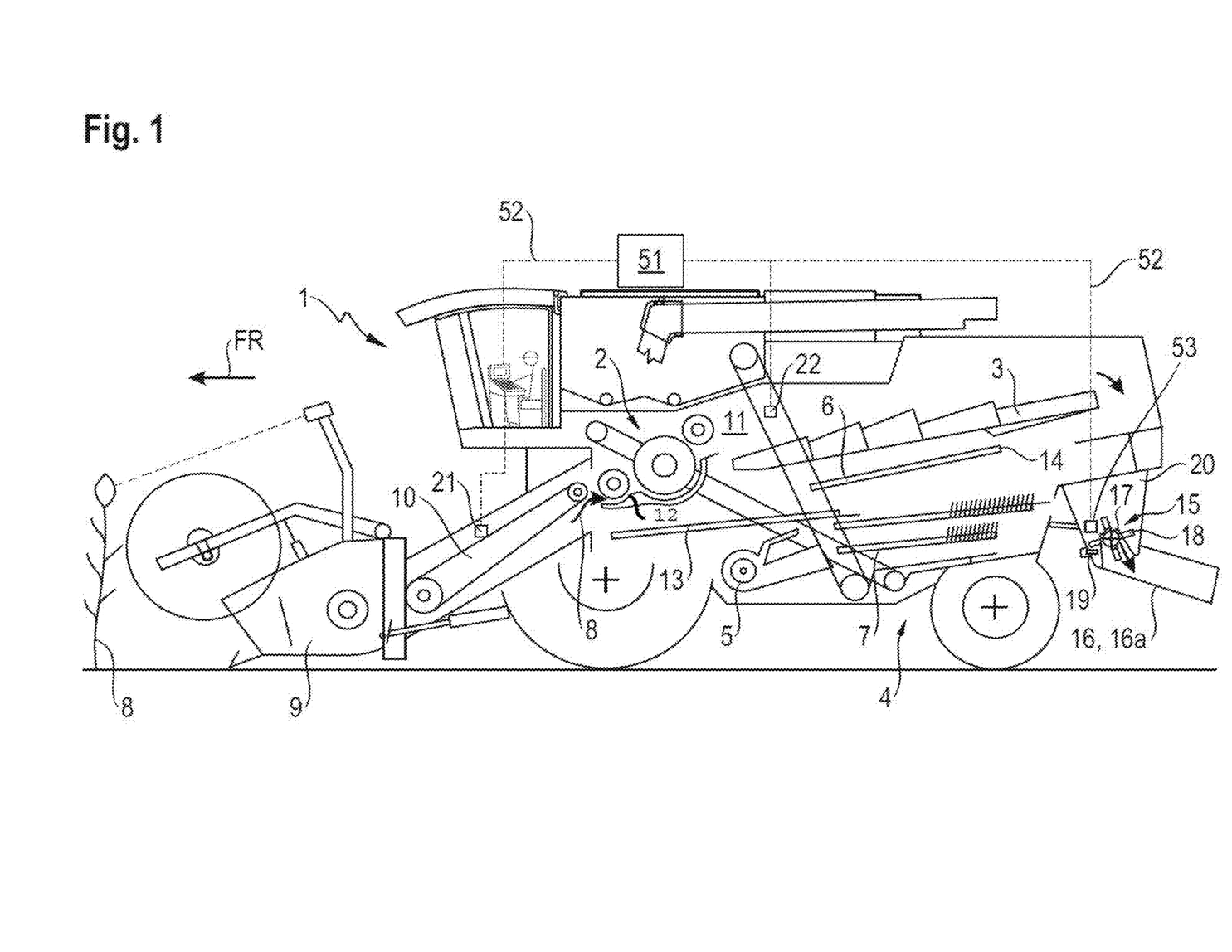
FIG. 1 illustrates a schematic depiction of an agricultural harvester.

Referring to the figures, FIG. 1 depicts the side view of harvester 1, such as a combine harvester, comprising one or more working units. Examples of the working unit include threshing unit 2 and a subsequent separating device 3, which may comprise a straw walker or tray-type shaker. Other working units are contemplated. Cleaning unit 4 may be disposed below the separating device 3. Cleaning unit 4 may comprise a cleaning blower 5 and at least two sifters (upper sifter 6 (which may comprise an upper sieve) and lower sifter 7 (which may comprise a lower sieve)), with the upper sifter 6 being positioned above the lower sifter 7. Various types of harvesters are contemplated, one of which is illustrated in FIG. 1. Other types of combine harvesters are contemplated including, but not limited to, harvesters having axial separating rotors as the separating device and harvesters having an axially disposed threshing-separating device. In this regard, any discussion regarding the harvester as illustrated in FIG. 1 may also be applied to other types of harvesters.

A cutting unit 9, such as a header, is positioned in the front area of the harvester 1 and is used to cut and gather crop 8 to be harvested. The cutting unit 9 conveys the harvested crop 8 to an inclined conveyor 10, which may comprise a feed rake and which may be positioned at the front side of harvester 1. The inclined conveyor 10 transfers the harvested crop 8 to the threshing unit 2, which is positioned within the machine housing 11, for threshing. A sensor may be positioned proximate or near to the inclined conveyor 10 in order to sense at least one aspect of the conveyor 10, such as at least one aspect of the harvested crop 8 as it is transferred by the conveyor 10. For example, the sensor may comprise detecting device 21 positioned within the inclined conveyor 10 and configured to sense the flow rate of the harvested crop 8. In one implementation, to accomplish sensing the flow rate, a crop volume sensor (e.g., a layer height sensor) is configured to sense the actual flow rate of the gathered crop 8. A grain-chaff mixture, which is composed mainly of grain, is separated by one or several threshing concaves 12 (such as one or more separating grates) of the threshing unit 2 and moves to the cleaning unit 4 via a preparation floor 13 (such as a grain pan) in order to separate grain from the non-grain components (e.g., from stalk parts and chaff parts). A moisture sensor 22 within the crop flow path is configured to sense at least one aspect of the harvested crop, such as configured to measure the moisture of the harvested crop.

In the rear region, a rotating turn drum or impeller is assigned to the threshing unit 2, and receives the crop flow or stream that emerges from the threshing unit 2. The crop flow is composed substantially of threshed stalks. The rotating turn drum or impeller then transports the crop flow to the separation device 3 (such as a tray-type shaker), which in turn transports the crop flow into the rear region of the harvester 1. Any grains that still remaining in the crop flow as well as any short straw and chaff are separated out by falling through the separating device 3, which may include sieve openings, onto the return floor 14 (such as a return pan). The return pan 14 transports the grains, the short straw and the chaff to the preparation floor 13 (such as a preparation pan).

From preparation floor 13, the harvested crop reaches the cleaning unit 4, in which the grains are separated from the short straw and from the chaff by means of the sifters 6, 7 that are driven in an oscillating manner. Using separating device 3, straw travels to the rear end of harvester 1, where it is conveyed to a chopping device 15 and to a subsequent spreader device 16, as further working equipment units of harvester 1. The chopping device 15 comprises, inter alia, a rotating chopping drum 17, which is mounted and supported within a chopping housing 20. The chopping drum 17 is equipped with movable blades 18, which mesh with counter blades 19 that are fixedly disposed inside the chopping housing 20. The blades 18 and counter blades 19 are used to chop the straw into small pieces (such as chopped crop) and accelerated thereto.

A large portion of the sieve overflow, which is composed largely of chaff that does not pass through the upper sifter 6, travels via the upper sifter 6 into the rear region of harvester 1 and can likewise be conveyed to chopping device 15. The crop stream, which emerges from chopping device 15 and is substantially composed of chopped straw and chaff, is conveyed to spreader device 16, which distributes the crop stream onto the field, such as across the width of attachment device (e.g., across the width of cutting unit 9). Spreader device 16 may be designed as radial spreader 16a. Radial spreader 16a may comprise multiple rotors, such as at least two rotors, that are driven in a rotating manner, which spread the chopped material flow across the width of attachment device (e.g., across the width of cutting unit 9) on the field.

Figure 2:
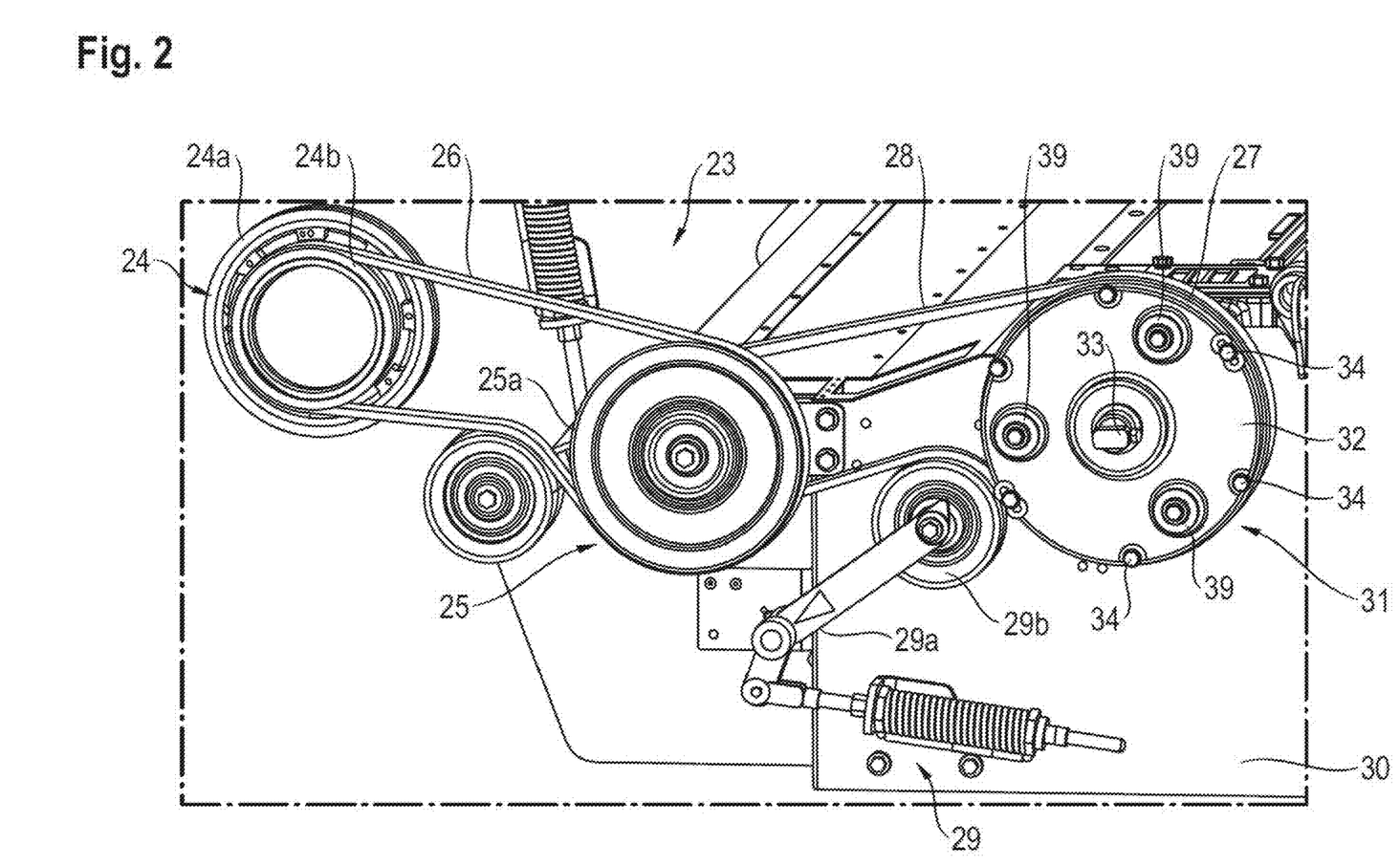
FIG. 2 illustrates a schematic partial depiction of a drive train of a working equipment of the agricultural harvester depicted in FIG. 1.

FIG. 2 depicts a schematic partial depiction of a drive train 23 of spreader device 16 of harvester 1, with the spreader device designed as radial spreader 16a. The principle design and function of a radial spreader 16a are known per se and is therefore not described in greater detail. A step drive 24 is formed by two belt pulleys 24a, 24b. The two belt pulleys 24a, 24b drive, via a belt 26, a transmission stage 25 with a drive belt pulley 25a. Drive belt pulley 25a of transmission stage 25 is operationally connected to an output belt pulley 27 via drive belt 28. A tensioning unit 29 pre-tensions the drive belt 28. The tensioning unit 29 rests on a housing 30 of the spreader device 16. The tensioning unit 29 comprises a tensioning roller 29b, which is pressed against drive belt 28 by means of a lever assembly 29a, which is tensioned by a spring force. In this way, the tensioning unit may maintain the belt tension of the drive belt 28. Drive belt pulley 27 is arranged on the outer surface area (such as the outer circumferential surface) of a housing 32 or a single-disc dry clutch 31, which forms a clutch system of the drive train 23. The single-disc dry clutch 31 may be operated hydraulically, with hydraulic connection 33 applying pressure on at least a part of the single-disc dry clutch 31.

Figure 3:
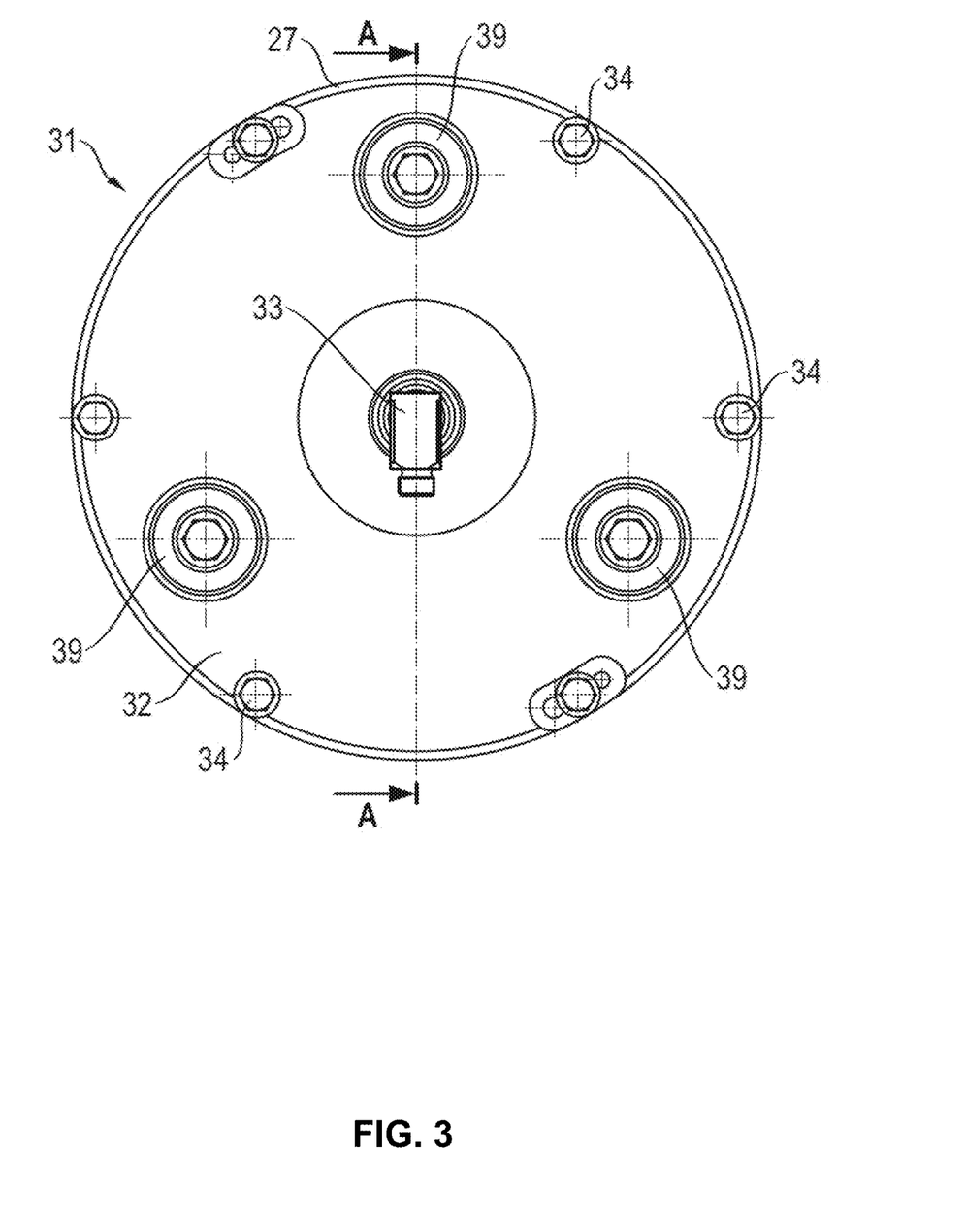
FIG. 3 illustrates a front view of the clutch system.

FIG. 3 depicts a front view of the clutch system. The depiction shows housing 32 of the single-disc dry clutch 31 and the output belt pulley 27, which is arranged or formed on its outer surface.

Figure 4:
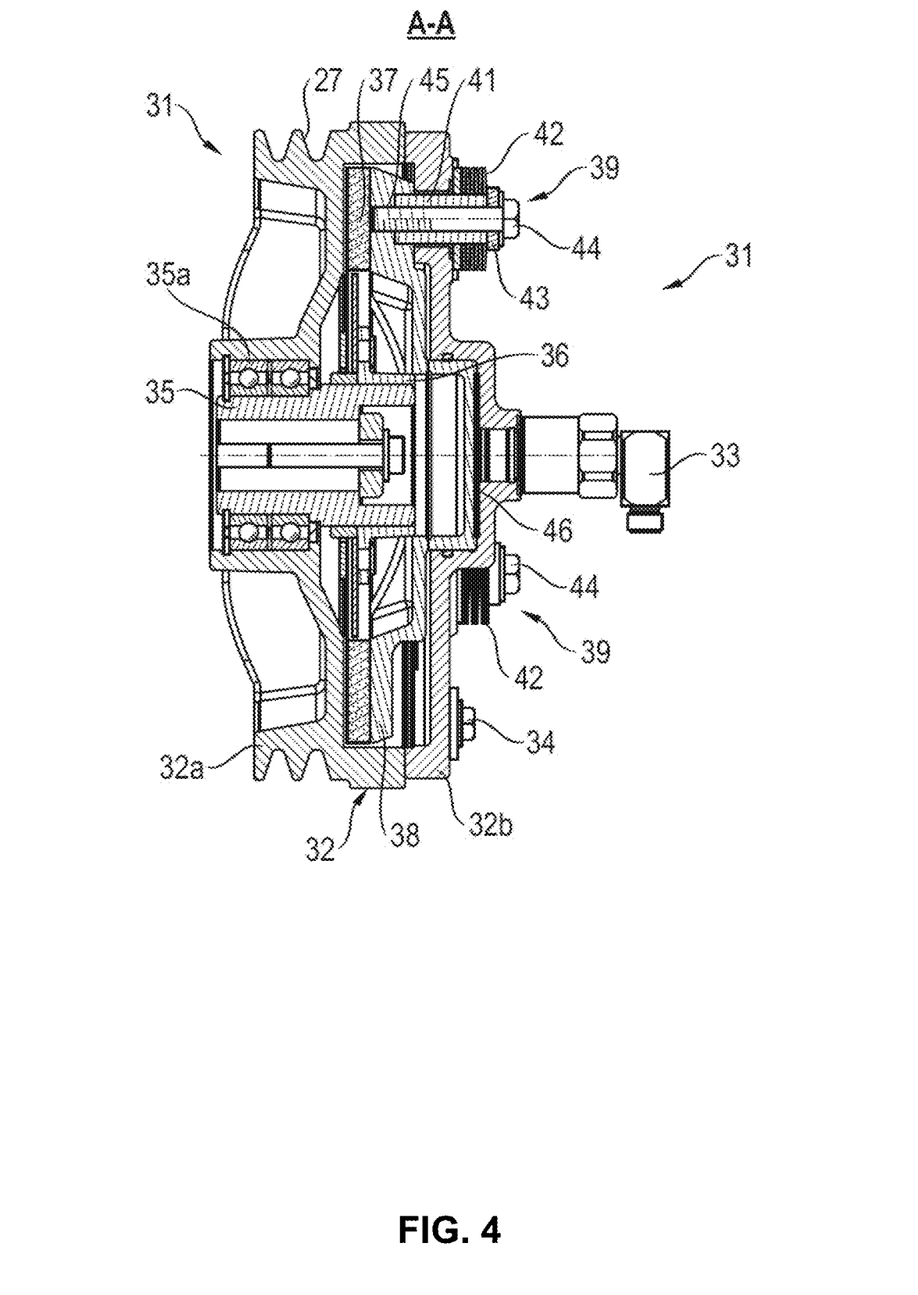
FIG. 4 illustrates a sectional depiction along the line A-A shown in FIG. 3.

FIG. 4 shows a sectional depiction of the single-disc dry clutch 31 along the line A-A according to FIG. 3. Housing 32 comprises a first housing section 32a and a second housing section 32b. The first housing section 32a and the second housing section 32b may be connected to each other, such as using one or more screws 34. The first housing section 32a is swivel or rotatably mounted on a shaft 35 using a rolling bearing arrangement 35a. A clutch disc 36 is arranged on shaft 35, which may be attached to it in a form-fit way using a toothing system and which can be moved in an axial direction. The clutch disc 36 may include a friction lining 37. A pressure plate 38, which may also be moved in axial direction, is positioned coaxially relative to clutch disc 36. Pressure plate 38 is connected to the second housing section 32b using pre-tensioned screw connections 39. The respective screw connection 39 comprises a bushing 40 (such as a socket), which extends through a through-hole 41 of the second housing section 32b. The bushing 40 may include a section that protrudes beyond the second housing section 32b. On that section, a pressure spring 42 may be positioned. The pressure spring may rest on the second housing section 32b and on a flange-like section 43 that is arranged on the open end of bushing 40. A connecting screw 44, which may traverse the bushing 40, is screwed into a threaded section 45 of the pressure plate 38. The screw connections 39 may be arranged in a plurality of ways. As one example, the screw connections 39 may be arranged at an offset in an angle of 120° in circumferential direction towards each other.

The pressure plate 38 features a piston-shaped section 46, which may be pressurized via a hydraulic connection 33 with hydraulic pressure or clutch pressure. The outer surface of the piston-shaped section 46 is sealed towards the second housing section 32b using a sealing ring 47. When pressure is applied to the piston-shaped section 46 of pressure plate 38, such as with clutch pressure, clutch disc 36 with its friction lining 37 is pressed against the first housing section 32a. When the piston-shaped section 46 is without pressure, e.g., there is no clutch pressure at the hydraulic connection 33, pressure plate 38 is held at a distance in relation to the first housing section 32a due to the reset force of the pressure spring 42. Thus, in this configuration, there is no friction connection between clutch disc 36 and the first housing section 32a.

The single-disc dry clutch 31 may combine multiple functions. For example, the single-disc dry clutch 31 may combine the coupling function, in which the torque transmission is performed by the pressurizing of the piston-shaped section 46 using a frictional connection, with the overload protection function, in which the maximum hydraulic pressure that is applied at the piston-shaped section 46 is limited to a predetermined amount (e.g., the single-disc dry clutch 31 slips when the torque exceeds a maximum hydraulic pressure). This slipping threshold may be adjusted in one of several ways. In one way, the slipping threshold may be adjusted using different maximum pressure levels, thereby reducing the complexity for various drive variants of spreader device 16. As discussed previously, spreader device 16 may be designed as a radial spreader device 16a, which may comprise one or more numbers of rotors (such as two rotors or four rotors). In this way, dependent on the number of rotors, such two rotors or four rotors, only the maximum pressure level need be adjusted, while the single-disc dry clutch 31 may remain unchanged in its construction, even with different numbers of rotors provided. Further, using the outer surface of the first housing section 32a as output belt pulley 27 may result in a reduction of assigned space for the assembly. Additionally, the adverse effects of dirt, damage and weather conditions on the clutch system may be reduced.

Figure 5:
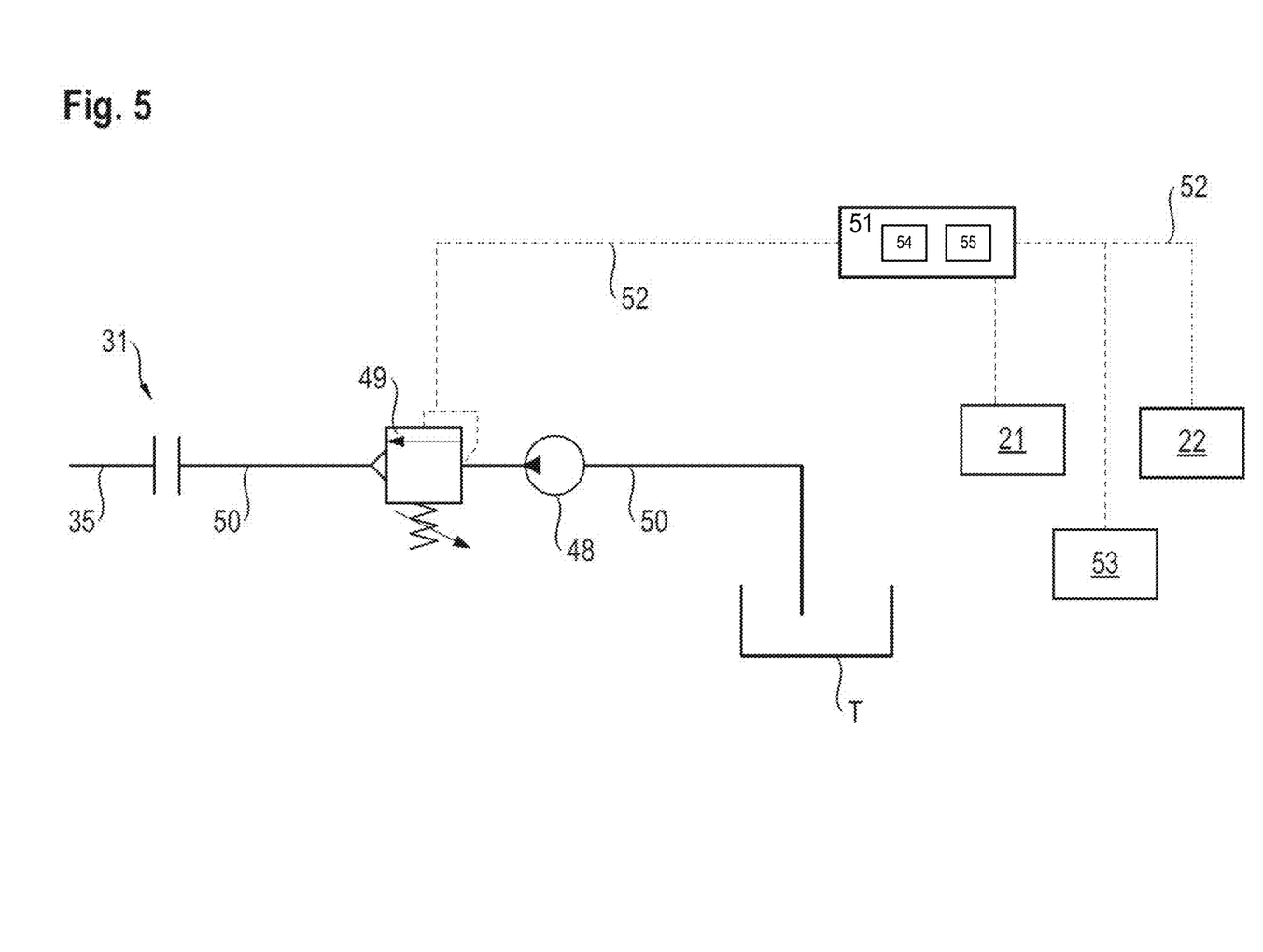
FIG. 5 illustrates a block wiring diagram as an example of regulation of the clutch system.

FIG. 5 depicts a simplified wiring diagram to illustrate regulating or controlling the clutch system. A pressure source, which may comprise a hydraulic pump 48, is supplied with hydraulic oil from a tank T. Using hydraulic line 50, the hydraulic oil reaches hydraulic connection 33 of the single-disc dry clutch 31 in order to apply pressure to the piston-shaped section 46. A pressure relief valve 49 allows adjustment of the maximum hydraulic pressure to various values, through which the piston-shaped section 46 is pressurized. To accomplish this, the pressure relief valve 49 may be regulated by a control unit 51. As one example, control unit 51 may control pressure relief valve via signal and control line 52. The signal and control line 52 may be a wired connection and/or a wireless connection, thereby enabling the control unit 51 to control the pressure relief valve 49 via a unidirectional communication (e.g., communication from the control unit 51 to the pressure relief valve 49) or bidirectional communication (e.g., communication between the control unit 51 and the pressure relief valve 49).

Control unit 51 may include a microprocessor 54 and a storage medium 55. The microprocessor 54 may comprise a type of controller, such as processor, a microcontroller, an Application Specific Integrated Circuit (ASIC), Programmable Logic Device (PLD), or Field Programmable Gate Array (FPGA), or the like. Storage medium 55 may comprise one or more types of storage medium, such as volatile memory and/or non-volatile memory. Further, microprocessor 54 and storage medium 55 may be separate devices, communicating via an external bus. Alternatively, microprocessor 54 and storage medium 55 may be within the same device, communicating via an internal bus. Logic, such the functionality described here, may be implemented in software stored in storage medium 55 and/or stored within microprocessor 54. For example, the logic of control unit in controlling the applied pressure may be implemented in software.

In one implementation, the pressure source may comprise a separate hydraulic pump 48, as depicted in FIG. 5. Alternatively, hydraulic pressure generated by a working hydraulic system may be used to operate the single-disc dry clutch 31 of the clutch system. For example, a constant pressure system in harvester 1 may be used to generate the hydraulic pressure. The control unit 51 may communicate, via one or more signal and control lines 52, with the detecting device 21 in order to detect the harvested crop flow, and with the moisture sensor 22.

For example, control unit 51 may receive one or more signals related to the harvested crops. For example, the control unit 51 may receive and evaluate signals generated by detecting device 21 and/or by moisture sensor 22. Further, the control unit 51 may control the regulation of the pressure relief valve 49, which may adjust the maximum hydraulic pressure, dependent on the one or more signals related to the harvested crops, such as dependent on one or both of the crop-related parameters for flow rate and moisture. As another example, the control unit may receive an indication of the length of the chopped material, and control the operation (such as the adjusting of the maximum hydraulic pressure) dependent thereto. Specifically, the length of the chopped material, which is another harvested crop parameter, may be determined based on the respective drive speed of the chopping device 15. To accomplish this, a speed sensor 53, such as a rotational speed sensor, may send one or more signals to control unit 51 via the signal and control line 52 for the control unit 51 to evaluate. As still another example, control unit 51 may be configured to perform the regulating of the applied hydraulic pressure dependent on at least one operating parameter of spreader device 16. As mentioned previously, one example operating parameter of spreader device 16 includes the number of the rotors of radial spreader 16a. In this regard, the control unit may perform the regulation of the applied hydraulic pressure dependent on any one, any combination, or all of: flow rate; moisture; drive speed of the chopping device; or number of rotors of the radial spreader.

In one implementation, the control unit 51 may access data in a memory, such as storage medium 55, with the memory storing one or more predetermined pressure amounts (such as one or more gradients, one or more applications of pressure, or the like). As discussed above, the memory may be associated with control unit 51 or may work in combination with control unit 51. The control unit 51 may use the one or more predetermined pressure amounts during various operations of the harvester, such as during engagement of the single-disc dry clutch 31 (e.g., a first maximum pressure amount during the startup procedure of radial spreader 16a of an operation of the harvester). For example, at various points of operation of the harvester (e.g., during engagement of the single-disc dry clutch 31 when apply pressure or by activating the radial spreader 16a), the control unit 51 may set the maximum hydraulic pressure (e.g., set a higher maximum hydraulic pressure than is used at other points of operation of the harvester) using a regulating of pressure relief valve 49, thereby potentially compensating for a torque peak that may occur. Afterwards, the control unit 51 may modify the maximum hydraulic pressure set. For example, the control unit 51 may modify the maximum hydraulic pressure set during the running operation of radial spreader 16a by a regulating of pressure relief valve 49, which corresponds to the desired overload torque. Thus, in one implementation, the continuous sensor-assisted detecting of harvested crop specific parameters enables continuous adaption of the adjusted overload torque (using control unit 51) dependent on at least one aspect of the system (e.g., dependent on at least one harvested crop characteristic including any one, any combination, or all of: the type of the fruit, moisture, flow rate and/or length of the chopped material).

LIST OF REFERENCE SIGNS

1 Harvester
2 Threshing unit
3 Separating device
4 Cleaning unit
5 Cleaning blower
6 Upper sifter
7 Lower sifter
8 Crop
9 Attachment device
10 Inclined conveyor
11 Machine housing
12 Threshing concave
13 Preparation floor
14 Return floor
15 Chopping device
16 Spreader device
16a Radial spreader
17 Chopping drum
18 Blade
19 Counter blade
20 Chopping housing
21 Detecting device
22 Moisture sensor
23 Drive train
24 Step drive
24a Belt pulley
24b Belt pulley
25 Transmission stage
25a Drive belt pulley
26 Belt
27 Output belt pulley
28 Drive belt
29 Tensioning unit
29a Lever assembly
29b Tensioning pulley
30 Housing of 16
31 Single-disc dry clutch
32 Housing
32a First housing section
32b Second housing section
33 Hydraulic connection
34 Screws
35 Shaft
35a Rolling bearing arrangement
36 Clutch disc
37 Friction lining
38 Pressure plate
39 Screw connection
40 Bushing
41 Through hole
42 Pressure spring
43 Flange-like section
44 Connecting screw
45 Threaded section
46 Piston-shaped section
47 Sealing ring
48 Hydraulic pump
49 Pressure relief valve
50 Hydraulic line
51 Control unit
52 Signal and control line
53 Speed sensor
54 Microprocessor
55 Storage medium
T Tank Each of the items listed above may be associated with a single electronic device or may be combined within a single electronic device. Further, with regard to each separate electronic device, processing/memory functionality may be included.

The methods, devices, processing, circuitry, and logic described above may be implemented in many different ways and in many different combinations of hardware and software. As discussed above, a microprocessor 54 and a storage medium 55 may be used. The microprocessor 54 and a storage medium 55 are merely one example of a computational configuration. Other types of computational configurations are contemplated. For example, all or parts of the implementations may be circuitry that includes a type of controller, including as an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may implement the functionality described herein and may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A drive train configured to drive at least one working unit of a self-propelled harvester, the drive train comprising:
   a selectable belt drive comprising a drive belt, a drive belt pulley, and an output belt pulley, wherein the output belt pulley of the belt drive is operationally connected to the at least one working unit via a drive shaft;
   a clutch system comprising a hydraulically-operated single-disc dry clutch and configured to operate as both a belt clutch and an overload clutch, wherein the clutch system is housed in a single structural unit, wherein a response characteristic of the clutch system operating as the overload clutch is hydraulically adjustable, and wherein the hydraulically-operated single-disc dry clutch comprises a section configured to be pressurized in which a maximum hydraulic pressure applied to the section is limited to a predetermined amount; and
   a control unit configured to:
      determine at least one configuration aspect of the at least one working unit or at least one harvested crop characteristic; and
      select the maximum hydraulic pressure from a plurality of maximum pressure levels based on the at least one configuration aspect of the at least one working unit or the at least one harvested crop characteristic for overload protection.

2. The drive train of claim 1, wherein the hydraulically-operated single-disc dry clutch is configured for reset using a spring.

3. A drive train configured to drive at least one working unit of a self-propelled harvester, the drive train comprising:
   a selectable belt drive comprising a drive belt, a drive belt pulley, and an output belt pulley, wherein the output belt pulley of the belt drive is operationally connected to the at least one working unit via a drive shaft; and
   a clutch system configured to operate as both a belt clutch and an overload clutch, wherein the clutch system is housed in a structural unit, and wherein a response characteristic of the clutch system operating as the overload clutch is hydraulically adjustable;
   wherein the clutch system comprising a housing section configured as the output belt pulley.

4. The drive train of claim 1, further comprising a pressure source configured to apply pressure on the section.

5. The drive train of claim 4, wherein the at least one working unit comprises a radial spreader; and
   wherein the control unit is configured to:
      determine at least one configuration aspect of the radial spreader; and
      select the maximum hydraulic pressure from a plurality of maximum pressure levels based on the at least one configuration aspect of the radial spreader.

6. The drive train of claim 5, wherein the at least one configuration aspect of the radial spreader comprises a number of rotors of the radial spreader.

7. The drive train of claim 1, wherein the belt drive further comprises a spring-loaded belt tensioning unit configured to pre-tension the drive belt.

8. The drive train of claim 1, further comprising a mechanical brake integrated into the drive train.

9. The drive train of claim 1, wherein the clutch system does not include a coupling cylinder, a clutch that solely functions as a friction clutch, and supports for guiding of the drive belt.

10. A harvester comprising:
    a working unit;
    a pressure source;
    a drive train, wherein the drive train comprises a selectable belt drive and a clutch system, wherein the selectable belt drive comprises a drive belt, a drive belt pulley, and an output belt pulley, wherein the output belt pulley of the belt drive is operationally connected to the at least one working unit via a drive shaft, wherein the clutch system comprises a hydraulically-operated single-disc dry clutch and is configured to operate as both a belt clutch and an overload clutch, wherein the clutch system is housed in a structural unit, wherein a response characteristic of the clutch system operating as an overload clutch is hydraulically adjustable, and wherein the hydraulically-operated single-disc dry clutch comprises a section configured to be pressurized in which a maximum hydraulic pressure applied to the section is limited to a predetermined amount; and a control unit in communication with the at least one working unit, the pressure source, and the drive train, the control unit configured to:
  determine at least one configuration aspect of the at least one working unit; and
  select the maximum hydraulic pressure from a plurality of maximum pressure levels based on the at least one configuration aspect of the at least one working unit for overload protection.

11. The harvester of claim 10, wherein the at least one working unit comprises a radial spreader.

12. The harvester of claim 11, wherein the clutch system does not include at least one of a coupling cylinder, a clutch that solely functions as friction clutch, or supports for guiding of the drive belt.

13. The harvester of claim 11, wherein the clutch system does not include a coupling cylinder, a clutch that solely functions as a friction clutch, and supports for guiding of the drive belt.

14. The drive train of claim 1, wherein the at least one working unit includes a number of hardware elements used for operation;
  wherein the at least one configuration aspect of the at least one working unit comprises the number of hardware elements used for operation of the at least one working unit; and
  wherein the control unit is configured to:
    determine the number of hardware elements used for operation of the at least one working unit;
    responsive to determining that the number of hardware elements of the working unit is a first number, select a first maximum hydraulic pressure from a plurality of maximum pressure levels; and
    responsive to determining that the number of hardware elements of the working unit is a second number, select a second maximum hydraulic pressure from the plurality of maximum pressure levels, the first number being different from the second number, the first maximum hydraulic pressure being different from the second maximum hydraulic pressure.

15. The drive train of claim 1, wherein the at least one harvested crop characteristic comprises at least one of a type of fruit, moisture, flow rate, or length of chopped material; and
  wherein the control unit is configured to:
    determine the at least one of the type of fruit, the moisture, the flow rate, or the length of the chopped material; and
    select the maximum hydraulic pressure from a plurality of maximum pressure levels based on the at least one of the type of fruit, the moisture, the flow rate, or the length of the chopped material.

16. The drive train of claim 1, wherein the at least one harvested crop characteristic comprises at least one of moisture or flow rate; and
  wherein the control unit is configured to:
    determine the at least one of the moisture or the flow rate; and
    select the maximum hydraulic pressure from a plurality of maximum pressure levels based on the at least one of the moisture or the flow rate.

17. The drive train of claim 1, wherein the at least one harvested crop characteristic comprises length of chopped material; and
  wherein the control unit is configured to:
    determine the length of chopped material; and
    select the maximum hydraulic pressure from a plurality of maximum pressure levels based on the length of chopped material.

18. The harvester of claim 10, wherein the at least one working unit includes a number of hardware elements used for operation;
  wherein the at least one configuration aspect of the at least one working unit comprises the number of hardware elements used for operation of the at least one working unit; and
  wherein the control unit is configured to:
    determine the number of hardware elements used for operation of the at least one working unit;
    responsive to determining that the number of hardware elements of the working unit is a first number, select a first maximum hydraulic pressure from a plurality of maximum pressure levels; and
    responsive to determining that the number of hardware elements of the working unit is a second number, select a second maximum hydraulic pressure from the plurality of maximum pressure levels, the first number being different from the second number, the first maximum hydraulic pressure being different from the second maximum hydraulic pressure.

* * * * *

UNITED STATES PATENT AND TRADEMARK OFFICE
CERTIFICATE OF CORRECTION

| | | |
|---|---|---|
| PATENT NO. | : 10,830,287 B2 | Page 1 of 1 |
| APPLICATION NO. | : 16/006191 | |
| DATED | : November 10, 2020 | |
| INVENTOR(S) | : Peter Pautz | |

It is certified that error appears in the above-identified patent and that said Letters Patent is hereby corrected as shown below:

On the Title Page

Item (73) The address for the Assignee:
"Harswewinkel"
Should be replaced with:
--Harsewinkel--

Signed and Sealed this
Fourth Day of May, 2021

Drew Hirshfeld
*Performing the Functions and Duties of the
Under Secretary of Commerce for Intellectual Property and
Director of the United States Patent and Trademark Office*